(12) United States Patent
Chen et al.

(10) Patent No.: US 10,854,146 B1
(45) Date of Patent: Dec. 1, 2020

(54) DIRECTIONAL OPTICAL WAVEGUIDE, DIRECTIONAL BACKLIGHT MODULE, AND DISPLAY DEVICE

(71) Applicant: CLOUDMINDS (SHENZHEN) ROBOTICS SYSTEMS CO., LTD., Guangdong (CN)

(72) Inventors: Fang Chen, Guangdong (CN); William Xiao-Qing Huang, Guangdong (CN); Tao Zhang, Guangdong (CN)

(73) Assignee: CLOUDMINDS (SHENZHEN) ROBOTICS SYSTEMS CO., LTD., Shenzhen (CN)

( * ) Notice: Subject to any disclaimer, the term of this patent is extended or adjusted under 35 U.S.C. 154(b) by 0 days.

(21) Appl. No.: 16/607,185

(22) PCT Filed: Apr. 28, 2017

(86) PCT No.: PCT/CN2017/082612
§ 371 (c)(1),
(2) Date: Oct. 22, 2019

(87) PCT Pub. No.: WO2018/196002
PCT Pub. Date: Nov. 1, 2018

(51) Int. Cl.
*G09G 3/34* (2006.01)
*G02B 30/33* (2020.01)
(Continued)

(52) U.S. Cl.
CPC ......... *G09G 3/3406* (2013.01); *G02B 6/0036* (2013.01); *G02B 6/0076* (2013.01);
(Continued)

(58) Field of Classification Search
None
See application file for complete search history.

(56) References Cited

U.S. PATENT DOCUMENTS

2005/0174340 A1* 8/2005 Jones ............... G02F 1/133753
345/204
2007/0097019 A1 5/2007 Wynne-Powell et al.
(Continued)

FOREIGN PATENT DOCUMENTS

CN 104508353 A 4/2015
CN 105372824 A 3/2016
(Continued)

OTHER PUBLICATIONS

International Search Report (and English translation) and Written Opinion of the International Searching Authority for International Application No. PCT/CN2017/082612 dated Jan. 26, 2018.
(Continued)

*Primary Examiner* — Carl Adams
(74) *Attorney, Agent, or Firm* — Heslin Rothenberg Farley & Mesiti P.C.

(57) ABSTRACT

A directional optical waveguide includes a time division multiplexing unit and N layers of optical waveguides that have a same light-emitting direction and that are stacked, a light-emitting surface of each layer of optical waveguide being provided with a pixel-type grating; the time division multiplexing unit being configured to hierarchically control, within each frame video stream cycle, the N layers of optical waveguides to introduce a source light ray into a corresponding pixel-type grating during a corresponding frame video period, and the source light ray that is introduced into the pixel-type grating being diffracted in the pixel-type grating to form a plurality of first-order diffraction light rays that have different diffraction angles and diffraction azimuth angles and are in a one-to-one correspondence with display pixels, to be incident on a next layer of optical waveguides.

16 Claims, 4 Drawing Sheets

(51) Int. Cl.
*F21V 8/00* (2006.01)
*H04N 13/359* (2018.01)
*H04N 13/398* (2018.01)

(52) U.S. Cl.
CPC ........... G02B 30/33 (2020.01); H04N 13/359 (2018.05); H04N 13/398 (2018.05); *G09G 2310/0297* (2013.01); *G09G 2310/08* (2013.01)

(56) References Cited

U.S. PATENT DOCUMENTS

| | | |
|---|---|---|
| 2010/0091354 A1 | 4/2010 | Nam et al. |
| 2015/0036068 A1 | 2/2015 | Fattal et al. |
| 2015/0205126 A1* | 7/2015 | Schowengerdt ........ G06F 3/011 345/633 |
| 2017/0363877 A1* | 12/2017 | Zhu .................... G02B 27/1086 |
| 2018/0052276 A1* | 2/2018 | Klienman .......... G02B 27/1086 |

FOREIGN PATENT DOCUMENTS

| | | |
|---|---|---|
| CN | 106054451 A | 10/2016 |
| CN | 106125316 A | 11/2016 |
| CN | 106291958 A | 1/2017 |
| CN | 106443867 A | 2/2017 |

OTHER PUBLICATIONS

Extended European Search Report for European Patent Application No. 17907699.7 dated Mar. 20, 2020.

Fattal, D., et al., "A multi-directional backlight for a wide-angle, glasses-free three-dimensional display", Nature, vol. 495, pp. 348-351 (2013).

* cited by examiner

DIRECTIONAL OPTICAL WAVEGUIDE, DIRECTIONAL BACKLIGHT MODULE, AND DISPLAY DEVICE

CROSS REFERENCE TO RELATED APPLICATIONS

This application is a national stage filing under section 371 of International Application No. PCT/CN2017/082612, filed on Apr. 28, 2017, published on Nov. 1, 2018 as WO 2018/196002 A1, the entire disclosure of which is hereby incorporated herein by reference.

TECHNICAL FIELD

The present disclosure relates to the field of stereoscopic display, and in particular, to a directional optical waveguide, a directional backlight module, and a display device.

BACKGROUND

The directional backlight naked-eye display technology is a display method capable of realizing naked-eye stereoscopic display, and the principle is controlling an emitting of backlight through the directional backlight naked-eye display technology, so that two images with parallax displayed on a display panel are fused into a stereoscopic image in user's brain after being sent to user's left and right eyes.

The existing directional backlight naked-eye display technology is mainly divided into a geometric optical directional backlight stereoscopic display technology and a wave optical directional backlight stereoscopic display technology. The wave optical directional backlight stereoscopic display technology can realize multi-directional light guide with a large directional modulation range and high modulation precision. A corresponding stereoscopic display device may not only implement omnidirectional viewing, but also may implement rotational viewing, so as to obtain a good visual effect and small crosstalk. Therefore, the wave optical directional backlight stereoscopic display technology becomes a research focus of the directional backlight naked-eye display technology.

At present, in a stereoscopic display device using the wave optical directional backlight stereoscopic display technology, a nano-grating corresponding to a display pixel is formed on a surface of a light guide plate of a display module. However, the nano-grating has a plurality of different orientation angles, and therefore, when the stereoscopic display device performs image display, a light ray propagating along one direction is regulated through orientation angles in the nano-grating, so that the light ray propagating along the direction is diffracted into a plurality of light rays having different propagation directions, thereby ensuring that a stereoscopic image displayed by the display panel of the stereoscopic display device has the advantages of multi-angle and rotatable viewing. However, because a stereoscopic display pixel resolution R3D is inversely proportional to a number of viewing angles NNulti-direction, and the number of viewing angles NNulti-direction is proportional to a number of pixel-type nano-grating orientation angle types, with respect to a two-dimensional plane display physical pixel resolution R2D, the display device applying the wave optical directional backlight stereoscopic display technology has the advantages of multi-angle and rotatable viewing, but it is at the cost of reducing the stereoscopic display pixel resolution, that is, the stereoscopic display device applying the wave optical directional backlight stereoscopic display technology has a problem that the stereoscopic display pixel resolution R3D is reduced relative to the two-dimensional plane display physical pixel resolution R2D.

SUMMARY

Embodiments of the present disclosure are intended to provide a directional optical waveguide, a directional backlight module, and a display device, to resolve a problem that a stereoscopic display pixel resolution R3D of the display device applying a wave optical directional backlight stereoscopic display technology is reduced relative to a two-dimensional plane display physical pixel resolution R2D.

To achieve the above objectives, the present disclosure uses the following technical solutions:

According to a first aspect, a directional optical waveguide is provided, including: a time division multiplexing unit and N layers of stacked optical waveguides with a same light-emitting direction, a pixel-type grating being disposed on a light-emitting surface of each layer of the optical waveguide; and N being an integer greater than or equal to 2.

The time division multiplexing unit is configured to control, according to a stacking order of the N layers of optical waveguides within each frame video stream cycle, the N layers of optical waveguides to introduce a source light ray into the corresponding pixel-type grating during a corresponding frame video period, the each frame video stream cycle includes N frame video periods in a one-to-one correspondence with the N layers of optical waveguides; the source light ray that is introduced into the pixel-type grating is diffracted in the pixel-type grating to form a plurality of first-order diffraction light rays in a one-to-one correspondence with display pixels, the plurality of first-order diffraction light rays are incident on an optical waveguide opposite to a light-emitting surface of the optical waveguide in which the pixel-type grating is located; and diffraction angles and diffraction azimuth angles of each of the first-order diffraction light rays are different.

In comparison to the existing art, in the directional optical waveguide provided in the first aspect of the embodiments of the present disclosure, because the N layers of optical waveguides are stacked, a light-emitting surface of each layer of optical waveguide 10 is provided with a pixel-type grating, and the N layers of optical waveguides have a same light-emitting direction, after each layer of the optical waveguide introduces source light rays, the source light rays introduced by each layer of the optical waveguides in the directional optical waveguides are diffracted for different times. However, each time diffraction occurs, diffraction angles and diffraction azimuth angles that are of a plurality of first-order diffraction light rays and that are formed by previous diffraction are shifted to some extent. Therefore, when the source light rays introduced by each layer of the optical waveguides are diffracted for different times, after the source light rays introduced by each layer of the optical waveguides are diffracted for corresponding times, diffraction angles and diffraction azimuth angles of the plurality of first-order diffraction light rays that are formed are different. Therefore, from a macroscopic point of view, when the directional optical waveguide provided in the embodiment of the present disclosure is applied to a display device, an image displayed by each display pixel of the display device is formed by superimposing the plurality of first-order diffraction light rays with different diffraction angles and diffraction azimuth angles. In this way, the stereoscopic display pixel resolution R3D of the display device applying the wave optical directional backlight stereoscopic display technology is increased relative to two-dimensional plane display physical pixel resolution R2D, thereby resolving the problem that the stereoscopic display pixel resolution R3D of the display device applying the wave optical directional backlight stereoscopic display technology is reduced relative to the two-dimensional plane display physical pixel resolution R2D.

A second aspect of the embodiments of the present disclosure provides a directional backlight module, including the directional optical waveguide provided in the first aspect of the embodiments of the present disclosure and N three-dimensional display light sources, the N three-dimensional display light sources and N layers of optical waveguides being in a one-to-one correspondence; each of the three-dimensional display light sources is disposed on a side face of the corresponding optical waveguide, and the N three-dimensional display light sources are respectively connected to a time division multiplexing unit through signals.

In comparison to the existing art, the beneficial effects of the directional backlight module provided in the second aspect of the embodiments of the present disclosure are the same as the beneficial effects of the directional optical waveguide provided in the first aspect of the embodiments of the present disclosure, and details are not described herein.

A third aspect of the embodiments of the present disclosure provides a display device, including the directional backlight module provided in the second aspect of the embodiments of the present disclosure and an optical switching member located on a light-emitting surface of the directional backlight module.

In comparison to the existing art, the beneficial effects of the display device provided in the third aspect of the embodiments of the present disclosure are the same as the beneficial effects of the directional optical waveguide provided in the first aspect of the embodiments of the present disclosure, and details are not described herein.

BRIEF DESCRIPTION OF THE DRAWINGS

To describe the technical solutions of the embodiments of the present disclosure or the existing technology more clearly, the following briefly introduces the accompanying drawings required for describing the embodiments or the existing technology. Apparently, the accompanying drawings in the following description show only some embodiments of the present disclosure, and a person of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

Embodiment 1

An embodiment of the present disclosure provides a directional optical waveguide. As shown in FIG. 1 to FIG. 4, the directional optical waveguide 1 includes a time division multiplexing unit 3 as shown in FIG. 4 and N layers of optical waveguides 10 as shown in FIG. 2, and the optical waveguide 10 may be a common light guide plate or a light guide film, or may be other light guide media. A light-emitting surface of each layer of optical waveguides 10 is provided with a pixel-type grating 10A, the N layers of optical waveguides 10 are stacked, and light-emitting directions of the N layers of optical waveguides 10 are the same; N being an integer greater than or equal to 2.

Figure 1:
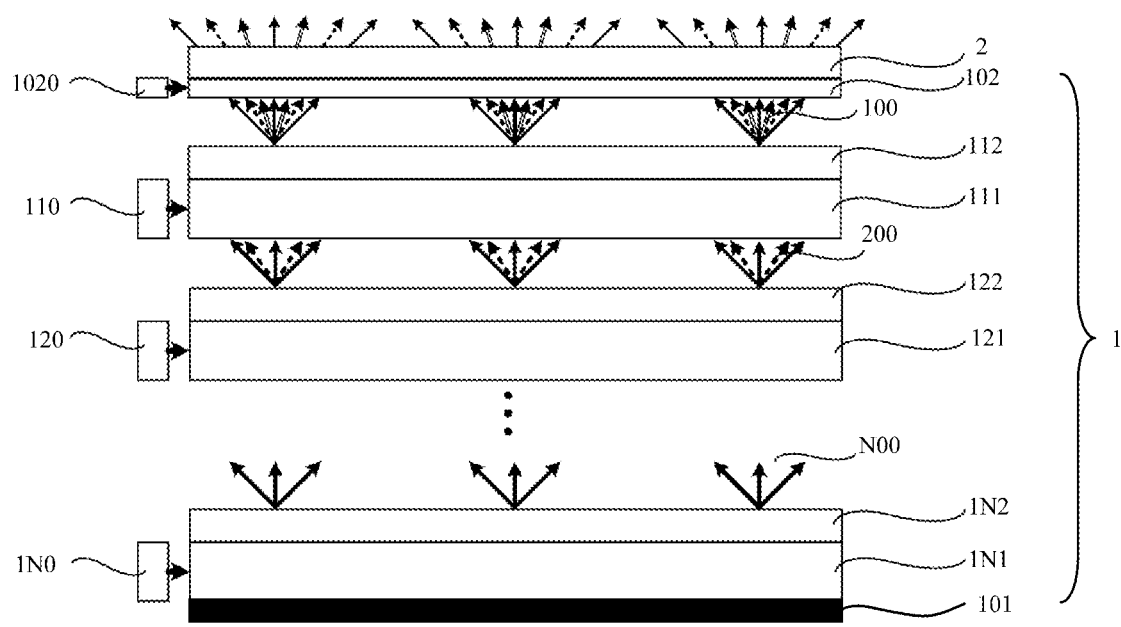
FIG. 1 is a schematic structural diagram of a directional optical waveguide applied to a display device according to an embodiment of the present disclosure.
Figure 2:
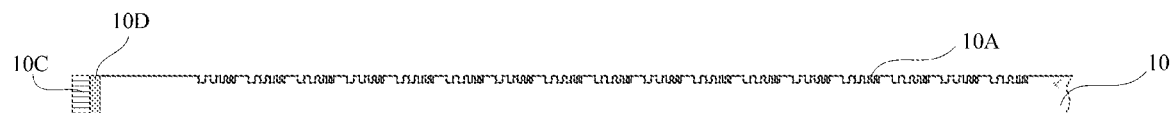
FIG. 2 is a schematic structural diagram of each layer of optical waveguide according to an embodiment of the present disclosure.

For example, as shown in FIG. 1, the directional optical waveguide 1 includes N layers of optical waveguides 10 that are stacked, the N layers of optical waveguides 10 being a first-layer optical waveguide 111, a second-layer optical waveguide 121, . . . , the Nth-layer optical waveguide 1N1. A Light-emitting surface of the first-layer optical waveguide 111 forms a first pixel-type grating 112, and a light-emitting surface of the second optical waveguide 121 forms a second pixel-type grating 122, . . . , a light-emitting surface of the Nth optical waveguide 1N1 forms an Nth pixel-type grating 1N2. After the directional optical waveguide provided in this embodiment is applied to a display device, a first three-dimensional display light source 110 is disposed on a side of the first-layer optical waveguide 111, a second three-dimensional display light source 120 is disposed on a side of the second-layer optical waveguide 121, . . . , and an Nth three-dimensional display source light 1N0 is disposed on a side of the Nth-layer optical waveguide 121, so as to ensure that a three-dimensional display light source corresponding to each layer of optical waveguides can provide source light rays for the layer of optical waveguide when each layer of optical waveguides needs to introduce a source light ray into a corresponding pixel-type grating.

Figure 5:
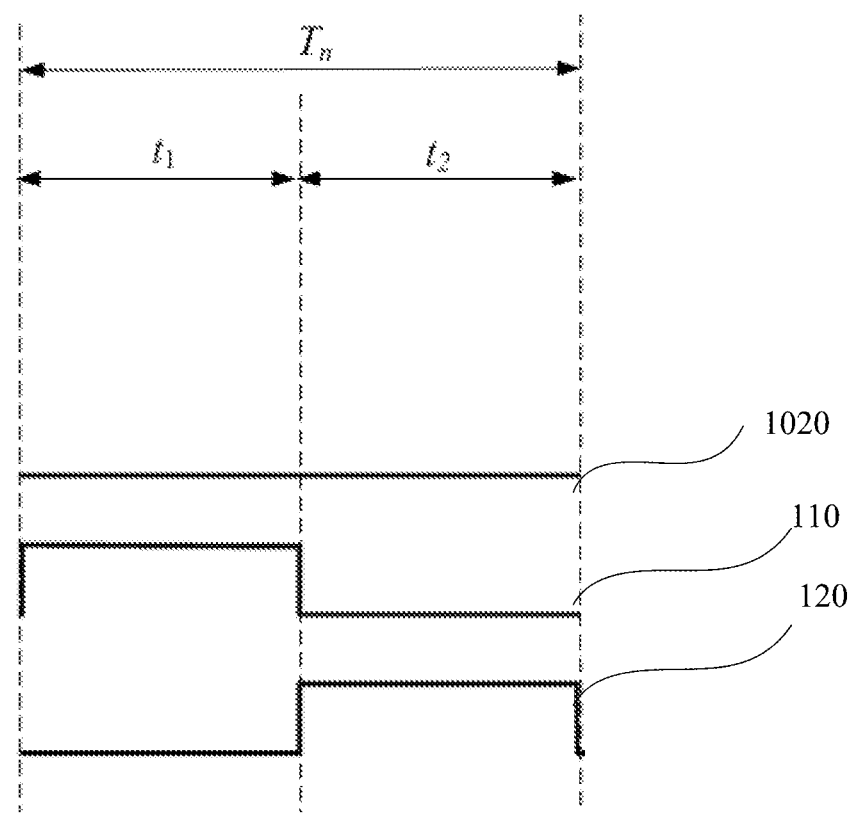
FIG. 5 is a timing diagram of a time division multiplexing unit according to an embodiment of the present disclosure.

As shown in FIG. 2 and FIG. 5, when the N layers of optical waveguides 10 introduce the source light ray to the corresponding pixel-type grating 10A, a time division multiplexing unit 3 controls introduction order. For example, each frame video stream cycle includes N frame video periods, the N frame video periods being in a one-to-one correspondence with the N layers of optical waveguides. The time division multiplexing unit 3 is configured to control, according to a stacking order of the N layers of optical waveguides in each frame video stream cycle, the N layers of optical waveguides 10 to introduce the source light ray into a corresponding pixel-type grating 10A in a corresponding frame video period, the source light ray introduced into the pixel-type grating is diffracted in the pixel-type grating to form a plurality of first-order diffraction light rays with different diffraction angles and different diffraction azimuth angles, and the plurality of first-order diffraction light rays are in a one-to-one correspondence with a plurality of display pixels. It may be understood that because an orientation angle of the grating has some influences on the diffraction angles and the diffraction azimuth angles of the diffracted first-order diffraction light rays, if the pixel-type grating 10A diffracts a plurality of first-order diffraction light rays, the pixel-type grating 10A should have a same number of orientation angles as the first-order diffraction light rays, magnitudes of the orientation angles being different.

Moreover, the stacking order of the N layers of optical waveguides in this embodiment may be sequentially stacked from top to bottom, or may be sequentially stacked from bottom to top. In order to explain more clearly how the time division multiplexing unit 3 controls, according to the stacking order of the N layers of optical waveguides, the N layers of optical waveguides 10 to introduce the source light ray into the corresponding pixel-type grating 10A in a corresponding frame video period, with reference to FIG. 1, FIG. 5, and FIG. 6, an example is used to describe a process that when there are two layers of optical waveguides, in an nth-frame video stream cycle, the time division multiplexing unit 3 controls, according to a stacking order of the two layers of optical waveguides, the two layers of optical waveguides 10 to introduce the source light ray into the corresponding pixel-type grating 10A in the corresponding frame video period.

First step, in a first frame video period t1 of the nth frame video stream cycle Tn, the time division multiplexing unit 3 controls the first three-dimensional display light source 110 to be turned on, so that the first-layer optical waveguide 111 introduces the source light ray provided by the first three-dimensional display light source 110 into the first pixel-type grating 112. After the source light ray provided by the three-dimensional display light source 110 is introduced into the first pixel-type grating 112, a plurality of first first-order diffraction light rays 100 are formed in the first pixel-type grating 112, the plurality of first first-order diffraction light rays 100 have different diffraction angles and diffraction azimuth angles. After the plurality of first first-order diffraction light rays 100 passes through a display panel, a stereoscopic image can be displayed.

Second step, in a second frame video period t2 of the nth frame video stream cycle Tn, the time division multiplexing unit 3 controls the first three-dimensional display light source 110 to be turned off and controls the second three-dimensional display light source 120 to be turned on, so that the second-layer optical waveguide 121 introduces the source light ray provided by the second three-dimensional display light source 120 into the second pixel-type grating 122. The source light ray provided by the second three-dimensional display light source 120 is diffracted for the first time in the second pixel-type grating 122 after being introduced into the second pixel-type grating 122, and a plurality of second first-order diffraction light rays 200 having different diffraction angles and diffraction azimuth angles are formed. The plurality of second first-order diffraction light rays 200 are incident on the first-layer optical waveguide 111 from the bottom of the first-layer the optical waveguide 111, are introduced into the first pixel-type grating 112 through the first-layer optical waveguide 111, and are diffracted for the second time in the first pixel-type grating 112. In this case, diffraction angles and diffraction azimuth angles of the plurality of second first-order diffraction light rays 200 that are diffracted for the second time are different from diffraction angles and diffraction azimuth angles of the plurality of first first-order diffraction light rays 100. After the second first-order diffraction light rays 200 that are diffracted for the second time pass through the display panel, the stereoscopic image can be displayed.

It may be learned based on the structure of the directional optical waveguide provided in this embodiment and the foregoing detailed descriptions that, because the N layers of optical waveguides 10 are stacked together, a light-emitting surface of each layer of the optical waveguides 10 is provided with a pixel-type grating, and the N layers of optical waveguides 10 have a same light-emitting direction, the source light ray introduced by the first-layer optical waveguide 111 is diffracted once through the first pixel-type grating 112 to form a plurality of first first-order diffraction light rays 100. After the source light ray introduced by the second-layer the optical waveguide 121 is diffracted once through the second pixel-type grating 122 to form a plurality of second first-order diffraction light rays 200, the plurality of second first-order diffraction light rays 200 further enters the first-layer optical waveguide 111 and diffracted again through the first pixel-type grating 112, and so on. After source light ray introduced by the Nth-layer optical waveguide 1N1 is diffracted once in the Nth pixel-type grating 1N2 to form a plurality of Nth first-order diffraction light rays N00, the plurality of Nth first-order diffraction light rays N00 are further diffracted for (N−1)th times sequentially through the (N−1)th pixel-type grating 1N-12, the (N−2)th pixel-type grating 1N-22, . . . , and the first pixel-type grating 112 in a direction of the light-emitting surface of the Nth-layer optical waveguide 1N1. Therefore, in the directional optical waveguide provided in this embodiment, after each layer of the optical waveguides introduces the source light rays, the source light rays introduced by each layer of the optical waveguides are diffracted for different times in the directional optical waveguides. However, each time diffraction occurs, diffraction angles and diffraction azimuth angles that are of a plurality of first-order diffraction light rays and that are formed by previous diffraction are shifted to some extent. Therefore, when the source light rays introduced by each layer of the optical waveguides are diffracted for different times, after the source light rays introduced by each layer of the optical waveguides are diffracted for corresponding times, diffraction angles and diffraction azimuth angles of the plurality of first-order diffraction light rays that are formed are different. In this way, when the directional optical waveguide provided in the embodiment of the present disclosure is applied to a display device, an image displayed by each display pixel of the display device is formed by superimposing the plurality of first-order diffraction light rays with different diffraction angles and diffraction azimuth angles. As a result, the stereoscopic display pixel resolution R3D of the display device applying the wave optical directional backlight stereoscopic display technology is increased relative to the two-dimensional plane display physical pixel resolution R2D, thereby resolving the problem that the stereoscopic display pixel resolution R3D of the display device applying the wave optical directional backlight stereoscopic display technology is reduced relative to the two-dimensional plane display physical pixel resolution R2D.

It may be understood that, because the N layers of optical waveguides 10 are stacked, and light-emitting directions of the N layers of optical waveguides 10 are the same, so that after the time division multiplexing unit controls, in each frame video stream cycle according to the stacking order of the N layers of optical waveguides 10, the N layers of optical waveguides 10 to introduce the source light rays into the corresponding pixel-type grating 10A in the corresponding frame video period, and the source light rays are diffracted, the plurality of first-order diffraction light rays that are formed can enter an optical waveguide opposite to the light-emitting surface of the optical waveguide in which the pixel-type grating 10A is located. The light rays of the plurality of first-order diffraction light rays N00 are diffracted again using the pixel-type grating corresponding to another optical waveguide. It can be seen that, from a microscopic point of view, after the time division multiplexing unit sequentially controls each optical waveguide in each frame video stream cycle to introduce the source light rays into the corresponding pixel-type grating, and the source light rays are diffracted, the source light rays introduced by each optical waveguide finally reaches human eyes in different times. However, from the macroscopic point of view, these lengths of each frame video period in each frame video stream cycle are very short, so that the user can ignore a time difference that the source light rays introduced by each optical waveguide in each video stream cycle finally reach human eyes when the user can see the light ray with the naked eye. In other words, each frame video stream viewed by the human eye is formed by superimposing the source light rays introduced by each optical waveguide after diffracted by the pixel-type grating, so that the stereoscopic display pixel resolution R3D of the display device can be increased after the directional optical waveguide provided in the embodiment is applied to the display device.

For example, as shown in FIG. 4, the time division multiplexing unit 3 in this embodiment includes N three-dimensional display voltage drive modules in a one-to-one correspondence with the N layers of optical waveguides, the N three-dimensional display voltage drive modules refers to a first three-dimensional display voltage drive module 301, a second three-dimensional display voltage drive module 302, . . . , an Nth three-dimensional display voltage drive module 30N. During each voltage drive cycle, N three-dimensional display voltage drive modules are used to control, according to the stacking order of the N layers of optical waveguides, the corresponding optical waveguide to introduce the source light rays into a corresponding pixel-type grating. During each voltage drive period, one of the N three-dimensional display voltage drive modules is configured to control the corresponding optical waveguide to introduce the source light ray into the corresponding pixel-type grating. Because the directional optical waveguide provided in the embodiment includes the N layers of stacked optical waveguides, and the N three-dimensional display voltage drive modules control the corresponding N layers of optical waveguides to introduce the source light ray into the corresponding pixel-type grating when driving at different voltages, but the N three-dimensional display voltage drive modules control the corresponding N layers of optical waveguides based on the stacking order of the N layers of optical waveguides. Therefore, a time length A of defining a voltage drive cycle of each three-dimensional display voltage drive module is the same as a time length T of each frame video stream cycle, so that each frame video stream cycle is in a one-to-one correspondence with each voltage drive cycle, to ensure that the N layers of optical waveguides can introduce, in each frame video stream cycle according to the stacking order of the N layers of optical waveguides, the source light rays into the corresponding pixel-type grating for diffraction in the corresponding frame video period. In addition, because in each voltage driving period, only one of the N three-dimensional display voltage drive modules is configured to control the corresponding optical waveguide to introduce the source light ray into the corresponding pixel-type grating to be diffracted. Therefore, when a time length of each voltage drive period is defined as A/N, and a time length of each frame video period is T/N, it can be ensured that time lengths for which each three-dimensional display voltage drive module controls the optical waveguide to introduce the source light ray into the corresponding pixel-type grating are the same within one frame video stream cycle. In this way, when the directional optical waveguide provided in the present disclosure is applied to a display device, images formed by the light rays provided by each layer of the optical waveguide in the directional optical waveguide enter human eyes at a uniform time interval from the microscopic point of view, which also helps improve quality of the image seen by the human eye.

Figure 3:
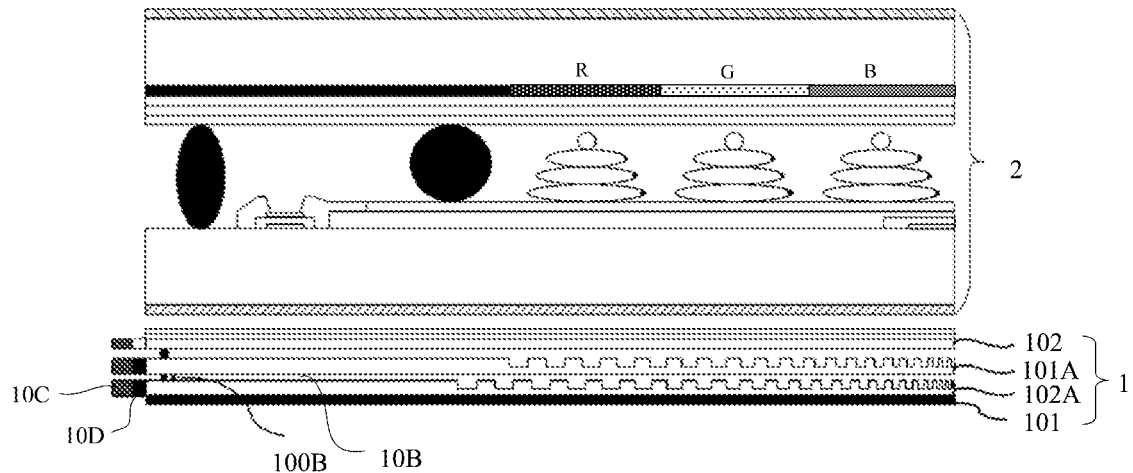
FIG. 3 is a schematic diagram of a correspondence between a pixel-type grating and a display pixel according to an embodiment of the present disclosure.
Figure 4:
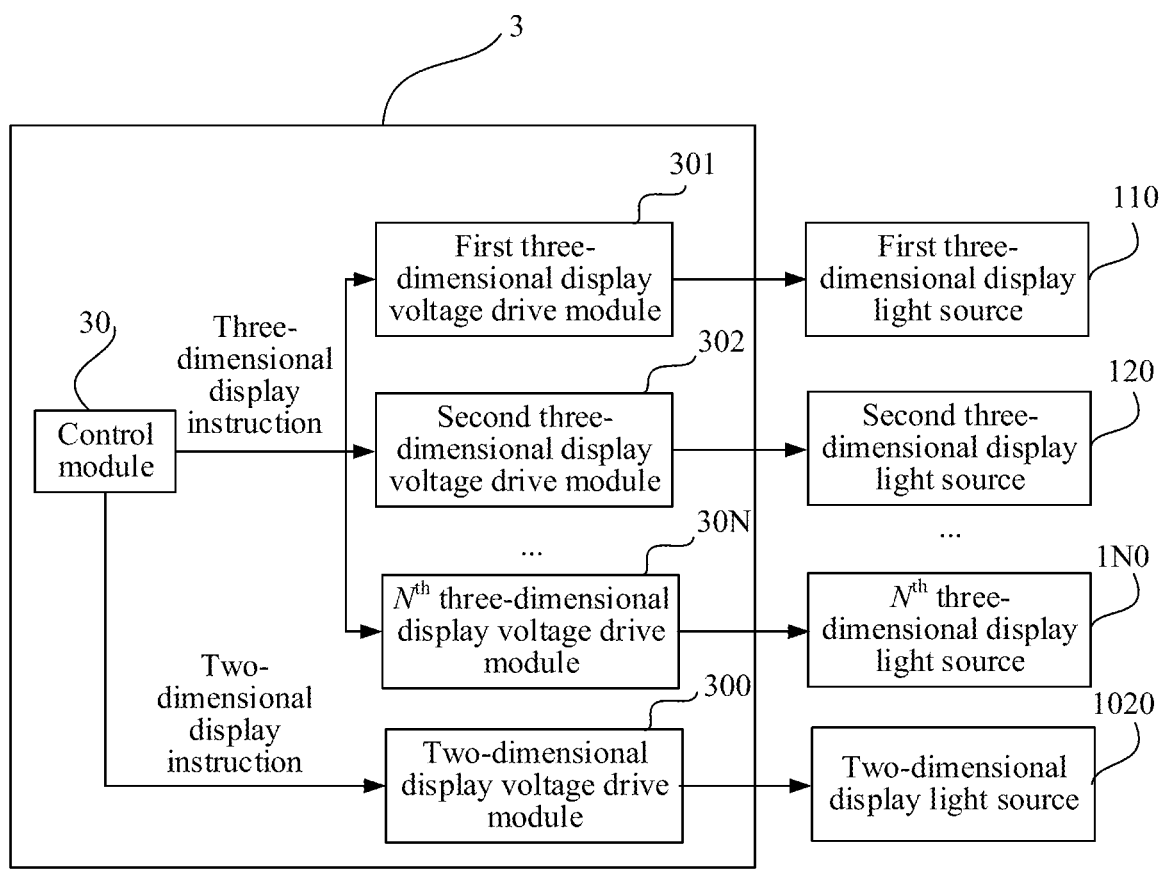
FIG. 4 is a block diagram of a connection between a time division multiplexing unit and a light source according to an embodiment of the present disclosure.

Further, as shown in FIG. 1 and FIG. 3, in the N layers of optical waveguide of the directional optical waveguide provided in this embodiment, when both the bottom of the first-layer optical waveguide 111 and the light-emitting surface of the Nth optical waveguide 1N1 are exposed, a light guide plate 102 may be provided outside the Nth pixel-type grating 1N2 corresponding to the Nth-layer optical waveguide 1N1. When a two-dimensional image needs to be displayed, the time division multiplexing unit 3 turns off the three-dimensional display light source corresponding to each layer of the optical waveguides, so that each layer of the optical waveguides stops introducing the source light ray, and controls the light guide plate 102 to guide the source light ray, thereby implementing the two-dimensional image display.

Similarly, in the N layers of optical waveguides of the directional optical waveguide provided in this embodiment, when the light-emitting surface of the first-layer optical waveguide 111 and the bottom surface of the Nth optical waveguide 1N1 are both exposed, the light guide plate 102 is provided outside the pixel-type grating corresponding to the first-layer optical waveguide. When a two-dimensional image needs to be displayed, the time division multiplexing unit 3 turns off the three-dimensional display light source corresponding to each layer of the optical waveguides, so that each layer of the optical waveguides stops introducing the source light ray, and controls the light guide plate 102 to guide the source light ray, thereby implementing the two-dimensional image display.

Based on the foregoing situation, referring to FIG. 4, the time division multiplexing unit 3 in this embodiment may further include a control module 30 and a two-dimensional display voltage drive module 300, and output terminals of the control module 30 are respectively connected to input terminals of the two-dimensional display voltage drive module 300 and N three-dimensional display voltage drive modules, so that the control module 30 is configured to send, to the N three-dimensional display voltage drive modules during three-dimensional display, a three-dimensional display operation instruction for enabling the N three-dimensional display voltage drive modules, and send, to the two-dimensional display voltage drive module 300 during two-dimensional display, a two-dimensional display operation instruction for enabling the two-dimensional display voltage drive module.

For example, referring to FIG. 3 to FIG. 5, the directional optical waveguide provided in the embodiment includes a first optical waveguide 111, a second optical waveguide 121, and a light guide plate 102. If the three-dimensional display is required, the control module 30 sends a three-dimensional display operation instruction to a first three-dimensional display voltage drive module 301 and a second three-dimensional display voltage drive module 302, so that in the voltage drive cycle corresponding to the nth video stream cycle Tn, the first three-dimensional display voltage drive module 301 controls the corresponding first optical waveguide 111 to introduce the source light ray into the first pixel-type grating 112 during the first voltage drive period t1, and the second three-dimensional display voltage drive module 302 controls the corresponding second optical waveguide 121 to introduce the source light ray into the second pixel-type grating 122 during a second voltage drive period t2. However, if two-dimensional display is required, the control module 30 sends a two-dimensional display operation instruction to the two-dimensional display voltage drive module 300, so that the two-dimensional display voltage drive module 300 directly controls the light guide plate 102 to guide the source light ray. Certainly, when the two-dimensional display is performed, the first three-dimensional display voltage drive module 301 and the second three-dimensional display voltage drive module 302 are in a turn off state.

It may be known by those skilled in the art that the specific process of controlling the optical waveguides and the light guide plate to be introduced into the source light rays by the time division multiplexing unit in the embodiment of the present disclosure may be performed by a computer program, and the computer program may be stored into a computer usable storage media (including but not limited to a disk storage, a CD-RON, an optical memory, etc.), to implement the process of controlling the optical waveguides and the light guide plate to introduce the source light rays.

In addition, the pixel-type grating in this embodiment can implement multi-view diffraction of light rays. For example, the pixel-type grating may be a common chirped grating, and may certainly be other pixel-type gratings capable of implementing multi-view diffraction. For example, as shown in FIG. 2, FIG. 3, and FIG. 6, the pixel-type grating 10A corresponding to each layer of optical waveguides 10 includes k gratings in a one-to-one correspondence with k display pixels; a grating corresponding to a same display pixel in adjacent two layers of optical waveguides 10 having a same grating cycle and having different grating phases.

Figure 6:
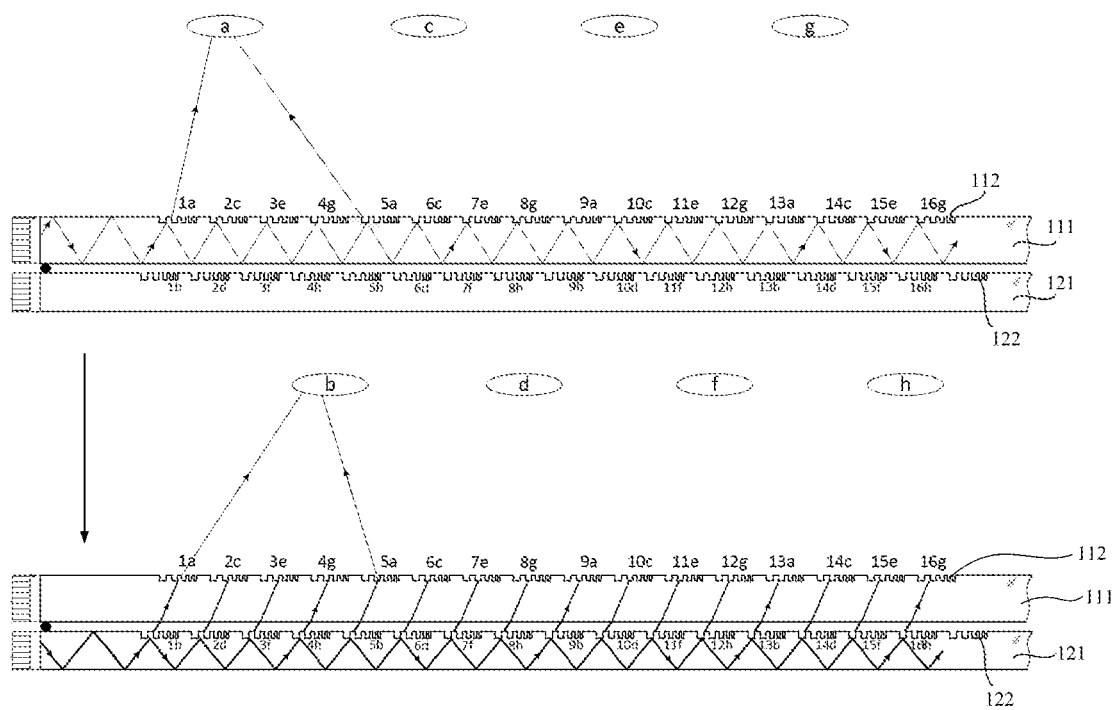
FIG. 6 is a schematic diagram of a working principle of a directional optical waveguide according to an embodiment of the present disclosure.

For example, as shown in FIG. 3 and FIG. 6, the directional optical waveguide provided in this embodiment has a first-layer optical waveguide 111 and a second-layer optical waveguide 121, and the first pixel-type grating includes 16 first gratings 112A, which are represented as 1a, 2c, 3e, 4g, 5a, 6c, 8g, 9a, 10c, 11e, 12g, 13a, 14c, 15e, 16g, 16 first gratings 112A being in a one-to-one correspondence with 16 display pixels. The second pixel-type grating 122 includes second gratings 122A, which are represented as 1b, 2d, 3f, 4h, 5b, 6d, 7f, 8h, 9b, 10d, 11f, 12h, 13b, 14d, 15f, 16h, 16 second gratings 122A being in a one-to-one correspondence with 16 display pixels. As shown in FIG. 3, in the first pixel-type grating 112 and the second pixel-type grating 122, the first grating 112A and the second grating 122A period have the same grating cycle corresponding to the same display pixel, and have different grating phases.

In the first frame video period t1 of the nth frame video stream cycle, the first-layer optical waveguide 111 introduces the source light ray into the first pixel-type grating 112 to perform first diffraction on the source light ray through the first grating 112A in the first pixel-type grating 112, a plurality of first first-order diffraction light rays 100 are formed, and the diffraction angles and the diffraction azimuth angles of the plurality of first first-order diffraction rays 100 are different, so that four display points a, c, e, g shown in FIG. 6A are formed when these light rays are applied to the image display. A light ray with a display point number a is from light rays diffracted by the first grating 112A labeled with 1a, 5a, 9a, 13a, a light ray with a display point number c is from the light rays diffracted by the first grating 112A with numbers 2c, 6c, 10c, 14c, the light ray with a display point number e is from the light ray diffracted by the first grating 112A with numbers 3e, 7e, 11e, 15e, and the light ray with a display point number g is from the light ray diffracted by the first grating 112A with numbers 4g, 8g, 12g, 16g.

Referring to FIG. 1, FIG. 3, FIG. 5, and FIG. 6, in the second frame video period t2 of the nth frame video stream cycle, the second-layer optical waveguide 121 introduces the source light ray into the second pixel-type grating 122 to utilize each second grating 122A of the second pixel-type grating 122 to perform first diffraction on the source light ray to form a plurality of second first-order diffraction light rays 200 having different diffraction angles and different diffraction azimuth angles. In addition, the plurality of second first-order diffraction light rays 200 are incident on the first-layer optical waveguide 111 from the bottom of the first-layer optical waveguide 111, and are introduced into the first pixel-type grating 112 through the first-layer optical waveguide 111 for second diffraction. Moreover, if the source light ray is firstly diffracted by the second pixel-type grating 122, assuming that a portion of the light rays is diffracted into the second first-order diffraction light ray 200 through the second grating 122A corresponding to an rth display pixel, then the portion of the second first-order diffraction light rays 200 is diffracted through the first pixel-type grating 112 for the second time, specifically through the first grating 112A corresponding to the rth display pixel. However, because the partial grating cycle of the first grating and the second grating corresponding to the same display pixel is the same, and the grating phase is different, after the second diffraction, there is a certain offset between the angle of the diffracted light ray and the angle of the first diffracted light ray. When these light rays are applied to the image display, four display points b, d, f, h are formed, the light ray with the display point number b being from the light ray diffracted by the second grating 122A with numbers 1b, 5b, 9b, 13b, the light ray with the display point number d being from the light ray diffracted by the second grating 122A with numbers 2d, 6d, 10d, 14d, the light ray with the display point number f being from the light rays diffracted by the second grating 122A with numbers 3f, 7f, 11f, 15f, and the light ray with the display point number h being from the light rays diffracted by the second grating 122A with numbers 4h, 8h, 12h, 16h.

Because the source light ray introduced by the first-layer optical waveguide 111 is only diffracted once, and the source light ray introduced by the second-layer optical waveguide 121 is diffracted twice, four display points b, d, f, h are not overlapped with locations of four display points a, c, e, g. In addition, because a time in which the source light ray introduced by the first-layer optical waveguide 111 is next to a time in which the source light ray introduced by the second-layer optical waveguide 121, so that from a microscopic point of view, the formation of four display points a, c, e, g and the formation of four display points b, d, f, h have a sequence, but this time difference is indistinguishable to the human eye. Therefore, from a macroscopic point of view, in one-frame video stream cycle, an image seen by the human eye is an image superimposed with four display points b, d, f, h and four display points b, d, f, h, which can improve the stereoscopic display pixel resolution R3D of the display device.

Considering that the cycle of the grating and colors of different subpixels in the display pixel follows a well-known principle in the art that a longer subpixel color wavelength leads to a longer grating cycle, referring to FIG. 2 and FIG. 3, it may be further defined that the pixel-type grating 10A corresponding to each layer of optical waveguides 10 includes k gratings in a one-to-one correspondence with k display pixels; the display pixel including a plurality of subpixels of different colors; each of the gratings including a plurality of sub-gratings in a one-to-one correspondence with the plurality of subpixels, and a longer color wavelength of the subpixel corresponding to the sub-grating leading to a longer grating cycle of the sub-grating.

For example, one display pixel in FIG. 3 includes a red subpixel R, a blue subpixel G, and a green subpixel B, and wavelengths of colors corresponding to the red subpixel R, the blue subpixel G, and the green subpixel B are sequentially decreased. Therefore, it may be learned from FIG. 3 that, a partial grating cycle of the first grating 112A and the second grating 122A corresponding to the red subpixel R is relatively long, a partial grating cycle of the first grating 112A and the second grating 122A corresponding to the green-blue subpixel B is shortest, and a partial grating cycle of the first grating 112A and the second grating 122A corresponding to the green subpixel G is at an intermediate location. In other words, a grating cycle of one grating in each of the pixel-type gratings has a same number as that of subpixels of the display pixel corresponding to the grating, and the corresponding location should also follow the matching principle that a longer wavelength of subpixel color leads to a longer grating cycle.

It may be learned based on the foregoing analysis that, in order to better realize the multi-view diffraction of light rays in a pixel-type grating, the partial grating cycle of each grating corresponding to different subpixels in the pixel-type grating may be appropriately controlled, so that the multi-view diffraction of the light rays can be controlled. As for how to properly control the partial grating cycle of each grating corresponding to different subpixels in the pixel-type grating, this can be controlled according to actual needs, and details are not described herein.

It should be noted that, as shown in FIG. 2, in the foregoing embodiment, a plurality of grooves constituting the pixel-type grating 10A are formed on the light-emitting surface of each layer of the optical waveguide 10; and depths of the plurality of grooves constituting the pixel-type grating 10A has an important influence on light ray diffraction capability of the pixel-type grating 10A. A deeper groove constituting the pixel-type grating 10A leads to a stronger diffraction intensity of the constituted pixel-type grating 10A. However, when the groove reaches a certain depth, the diffraction intensity of the pixel-type grating 10A will not increase any more, but the diffraction intensity of the pixel-type grating 10A will be weaker as the depth increases. Therefore, the depth is used as a depth boundary value. When a groove whose depth is less than the depth boundary value constitutes a pixel-type grating 10A, a principle that the deeper groove constituting the pixel-type grating 10A leads to a stronger diffraction intensity of the pixel-type grating 10A is followed. When a groove whose depth is larger than the depth boundary value constitutes a pixel-type grating 10A, a principle that the deeper groove constituting the pixel-type grating 10A leads to a lower diffraction intensity of the constituted pixel-type grating 10A.

Considering that the formation difficulty and the formation cost for forming the groove on the light-emitting surface of the optical waveguide are to be increased, as shown in FIG. 1, in the N layers of optical waveguides, the bottom of the first-layer optical waveguide 111 and the light-emitting surfaces of the Nth-layer optical waveguide 1N1 are both exposed, the depths of the grooves corresponding to the N layers of optical waveguides gradually decreases according to the stacking order of the N layers of optical waveguides, and the depths of the grooves corresponding to the N layers of optical waveguide is less than the depth boundary value. This is because source light rays introduced by a smaller number layer of optical waveguides are diffracted for more times. If the diffraction intensity of the light source is not high at first, penetrating power of the source light ray will be greatly affected, unable to display images effectively. Therefore, it is defined, according to the stacking order of the N layers of optical waveguides, that the depths of the grooves corresponding to the N layers of optical waveguides are gradually reduced, so that the diffraction intensity of the optical waveguide having a smaller number layer is stronger, to ensure that source light rays introduced by the optical waveguide having a smaller number layer have good penetrating power and can be used in the image display after diffraction for a plurality of times.

Likewise, in the N layers of optical waveguides, when a light-emitting surface of the first-layer optical waveguide 111 and a bottom surface of the Nth-layer optical waveguide 1N1 are both exposed, depths of grooves corresponding to the N layers of optical waveguides gradually increase according to the stacking order of the N layers of optical waveguides, and depths of grooves corresponding to the N layers of optical waveguides are less than the depth boundary value. It is defined, according to the stacking order of the N layers of optical waveguides, that the depths of the grooves corresponding to the N layers of optical waveguides are gradually increased, so that the diffraction intensity of the optical waveguide with a larger number layer is stronger, to ensure that source light rays introduced by the optical waveguide having a larger number layer have good penetrating power and can be used in the image display after diffraction for a plurality of times.

For example, when the directional optical waveguide provided in this embodiment has the first-layer optical waveguide 111 and the second-layer optical waveguide 121, the light-emitting surface of the first-layer optical waveguide 111 is exposed, and the bottom of the second-layer optical waveguide 111 is exposed. In this case, the depth of the groove that constitutes the first pixel-type grating 112 and that is formed by the light-emitting surface of the first-layer optical waveguide 111 is less than the depth of the groove that constitutes the second pixel-type grating 122 and that is formed by the light-emitting surface of the second-layer optical waveguide 121. Therefore, the depth of the groove constituting the first pixel-type grating 112 and the depth of the groove constituting the second pixel-type grating 122 should be less than the depth boundary value.

In order to ensure that unnecessary refraction of the plurality of first-order diffraction light rays diffracted by a pixel-type grating of one layer of the optical waveguides are reduced as much as possible before entering a next layer of optical waveguide, referring to FIG. 3 and FIG. 6, there is a gap 10B between adjacent two layers of optical waveguides, so that the plurality of first-order diffraction light rays diffracted by the pixel-type grating of one layer of the optical waveguides maintain the original diffraction angle and the diffraction azimuth angle as much as possible before entering the next layer of optical waveguide, thereby ensuring that the first-order diffraction light ray diffracted by the pixel-type grating of one layer of optical waveguide enters the next layer of optical waveguide.

Consider that the display device is divided into a display area and a peripheral area, the display area is used for image display, and the peripheral area is a border area and is not displayed. When the directional optical waveguide provided in this embodiment is applied to a display device, each optical waveguide should include a display corresponding area and a peripheral corresponding area formed on the periphery of the display corresponding area, the display corresponding area corresponding to a display area of the display device, and the peripheral corresponding area corresponding to the peripheral area of the display device. The pixel-type grating is formed in the display corresponding area of the corresponding optical waveguide, to ensure that the display area can display images. However, in order not to affect the image display of the display device, as shown in FIG. 3, in this embodiment, a portion of the gap 10B corresponds to the peripheral corresponding area is provided with a support 100B between adjacent two layers of optical waveguides, so that when the images are displayed, the support 100B does not affect the image display of the display device.

Certainly, the portion of the gap 10B corresponding to the peripheral corresponding region may not be disposed with the support 100B disposed between the adjacent two layers of optical waveguides, but a transparent dielectric layer in the gap located between the adjacent two layers of the optical waveguides 10 may be disposed. It is ensured that a refractive index of the transparent dielectric layer is less than a refractive index of the two layers of optical waveguides adjacent to the transparent dielectric layer, so that the plurality of first-order diffraction light rays diffracted by the pixel-type grating of one layer of the optical waveguides have no much impact on the diffraction angle and the diffraction azimuth of the plurality of first-order diffraction light rays despite a certain refraction before entering the next layer of optical waveguide.

In addition, a thickness of each layer of the optical waveguides in this embodiment should satisfy an optical waveguide characteristic equation. In the N layers of optical waveguides, when a bottom of the first-layer optical waveguide 111 and the light-emitting surface of the Nth-layer optical waveguide 121 are both exposed, an optical waveguide characteristic equation of each layer of the optical waveguides is:

$$k_{ix}d_i - \arctan\frac{\sqrt{(n_i^2 - n_{i0}^2)k_0^2 - k_{ix}^2}}{k_{ix}} - \arctan\frac{\sqrt{(n_i^2 - n_{(i+1)0}^2)k_0^2 - k_{ix}^2}}{k_{ix}} = m_i\pi,$$

$$m_i = 0, 1, 2, \ldots$$

In the N layers of optical waveguides, when a light-emitting surface of the first-layer optical waveguide 111 and a bottom surface of the Nth-layer optical waveguide 1N1 are both exposed, an optical waveguide characteristic equation of each layer of the optical waveguides is:

$$k_{ix}d_i - \arctan\frac{\sqrt{(n_i^2 - n_{(i+1)0}^2)k_0^2 - k_{ix}^2}}{k_{ix}} - \arctan\frac{\sqrt{(n_i^2 - n_{i0}^2)k_0^2 - k_{ix}^2}}{k_{ix}} = m_i\pi,$$

$$m_i = 0, 1, 2, \ldots$$

kix is a component of a wave vector of an ith optical waveguide in an x-axis direction, k0=2π/λ, λ being a wavelength of a light ray, ni being a refractive index of the ith-layer optical waveguide, and ni0 being a refractive index of an area between the ith-layer optical waveguide and the (i−1)th layer of optical waveguide, n(i+1)0 being a refractive index of an area between the ith-layer optical waveguide and the (i+1)th layer of optical waveguide, di being a thickness of the ith-layer optical waveguide, mi being a number of first-order diffraction light rays diffracted by a pixel-type grating corresponding to the ith-layer optical waveguide, and i being an integer that is greater than or equal to 1 and less than or equal to N. It may be learned from the optical waveguide characteristic equation of each layer of optical waveguide that a number of first-order diffraction light rays diffracted by the pixel-type grating corresponding to each layer of the optical waveguide may be adjusted through adjusting the thickness of each layer of the optical waveguides, the refractive index of each layer of the optical waveguides, a refractive index of an area between each layer of the optical waveguides and a previous layer of optical waveguide, and a refractive index of an area between each layer of the optical waveguides and the next layer of optical waveguide, thereby adjusting the diffraction posture of the light ray.

Further, as shown in FIG. 6, the directional optical waveguide provided in this embodiment includes a first-layer optical waveguide 111 and a second-layer optical waveguide 121, a light-emitting surface of the first-layer optical waveguide 111 and a bottom of the second-layer optical waveguide 121 are exposed. The optical waveguide characteristic equation of the first-layer optical waveguide 111 is:

$$k_{1x}d_1 - \arctan\frac{\sqrt{(n_1^2 - n_{20}^2)k_0^2 - k_{1x}^2}}{k_{1x}} - \arctan\frac{\sqrt{(n_1^2 - n_{10}^2)k_0^2 - k_{1x}^2}}{k_{1x}} = m_1\pi,$$

$$m_1 = 0, 1, 2, \ldots$$

The optical waveguide characteristic equation of the second-layer optical waveguide 121 is:

$$k_{2x}T_2 - \arctan\frac{\sqrt{(n_2^2 - n_{30}^2)k_0^2 - k_{2x}^2}}{k_{2x}} - \arctan\frac{\sqrt{(n_2^2 - n_{20}^2)k_0^2 - k_{2x}^2}}{k_{2x}} = m_2\pi,$$

$$m_2 = 0, 1, 2, \ldots$$

k1x is a component of a wave vector of the first-layer optical waveguide in the x-axis direction, n10 is a portion with which the light-emitting surface of the first-layer optical waveguide 111 is in contact, n20 is a portion between the first-layer optical waveguide 111 and the second-layer optical waveguide 111, n30 is the portion with which the bottom of the second-layer optical waveguide 121 is in contact, m1 is a number of first-order diffraction rays diffracted by the pixel-type grating corresponding to the first-layer optical waveguide, and m2 is a number of second-order diffraction light rays diffracted by the pixel-type grating corresponding to the second-layer optical waveguide.

Embodiment 2

Referring to FIG. 1, an embodiment of the present disclosure provides a directional backlight module 1, including the directional optical waveguide and N three-dimensional display light sources provided in the foregoing embodiments, the N three-dimensional display light sources and N layers of optical waveguides are in a one-to-one correspondence; each of the three-dimensional display light sources is disposed on a side of a corresponding optical waveguide, and the N three-dimensional display light sources are respectively connected to a time division multiplexing unit through signals.

For example, as shown in FIG. 1 and FIG. 4, the N three-dimensional display light sources are respectively a first three-dimensional display light source 110, a second three-dimensional display grating 120, . . . , and the Nth three-dimensional display light source 1N0. As shown in FIG. 4, the first three-dimensional display light source 110 is disposed on a side of the first-layer optical waveguide 111, the second three-dimensional display light source 120 is disposed on a side of the second-layer optical waveguide 121, . . . , and the Nth three-dimensional display light source 1N0 is provided on a side of the Nth-layer optical waveguide 1N1.

When the time division multiplexing unit 3 includes N three-dimensional display voltage drive modules, the first three-dimensional display light source 110 is connected to the first three-dimensional display voltage drive module 301 through signals, and the second three-dimensional display light source 120 is connected to the second three-dimensional display voltage drive module 302 through signals, . . . , the Nth three-dimensional display light source 1N0 is connected to the Nth three-dimensional display voltage drive module 30N through signals, so that when the corresponding optical waveguide needs to introduce source light ray, the corresponding three-dimensional display light source controls, to be turned on, the three-dimensional display light source on a side of the optical waveguide that needs to introduce the source light ray.

In comparison to the existing art, the beneficial effects of the directional backlight module 1 provided in the embodiments of the present disclosure are same as the beneficial effects of the directional optical waveguide provided in embodiment 1, and details are not described herein.

It may be understood that, referring to FIG. 1 and FIG. 3, the directional backlight module 1 provided in this embodiment should further include a reflection plate 101. In the N layers of optical waveguides, when the bottom of the first-layer optical waveguide 111 and the light-emitting surface of the Nth-layer optical waveguide 1N1 are exposed, the bottom of the first-layer optical waveguide is provided with the reflection plate 101, to prevent light leakage. Or, in the N layers of optical waveguides, when the light-emitting surface of the first-layer optical wave 111 and the bottom surface of the Nth-layer optical waveguide 1N1 are exposed, the bottom of the Nth-layer optical waveguide is provided with a reflection plate to prevent light leakage.

However, in order to enable the directional backlight module provided in this embodiment to be used not only for three-dimensional image display but also for two-dimensional image display, it should be ensured that the directional optical waveguide includes the light guide plate 102. As shown in FIG. 1 and FIG. 4, in this case, the directional backlight module further includes a two-dimensional display light source 1020, the two-dimensional display light source 1020 is disposed on a side of the light guide plate 102, and the light source two-dimensional display is connected to the time division multiplexing unit through signals, to ensure that the time division multiplexing unit can be used to turn on the two-dimensional display light source 1020 when the two-dimensional image needs to be displayed. In this case, the time division multiplexing unit should further include a control module 30 and a two-dimensional display voltage drive module 300. The two-dimensional display voltage drive module 300 is connected to the two-dimensional display light source 1020 through signals. For a connection relationship between the control module 30, the two-dimensional display voltage drive module 300, and each three-dimensional display voltage drive module, reference is made to the corresponding location description in the embodiment 1.

It should be noted that, in this embodiment, whether a three-dimensional display light source or a two-dimensional display light source 1020 has various specific structures. For example, when the three-dimensional display light source and the two-dimensional display light source 1020 use the structures shown in FIG. 3 and FIG. 6, the three-dimensional display light source and the two-dimensional display light source 1020 both include a light source 10C and a light collimation module 10D disposed on the light-emitting surface of the light source 10C.

Embodiment 3

An embodiment of the present disclosure provides a display device, as shown in FIG. 1, the display device includes the directional backlight module 1 provided in embodiment 2 and an optical switching member 2 located on a light-emitting surface of the directional backlight module, and the optical switching member 2 may be a display panel, or may be other optical switching member capable of implementing image display. When the image is displayed, the backlight of the directional backlight module 1 is adjusted through the optical switching member 2 to realize image display.

In comparison to the existing art, the beneficial effects of the display device provided in the embodiment of the present disclosure are the same as the beneficial effects of the directional optical waveguide provided in embodiment 1, and details are not described herein.

The display device provided in this embodiment may be any product or component having a display function, for example, a general mobile phone, a tablet computer, a television, a display, a notebook computer, a digital photo frame, or a navigator.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the appended claims.

What is claimed is:

1. A directional optical waveguide, comprising:
    a time division multiplexing unit, and
    N layers of stacked optical waveguides with a same light-emitting direction, a light-emitting surface of each layer of the optical waveguide being provided with a pixel-type grating, and N being an integer greater than or equal to 2; wherein,
    the time division multiplexing unit is configured to control, according to a stacking order of the N layers of optical waveguides within each frame video stream cycle, the N layers of optical waveguides to introduce a source light ray into the corresponding pixel-type grating during a corresponding frame video period, the each frame video stream cycle comprises N frame video periods in a one-to-one correspondence with the N layers of optical waveguides; the source light ray that is introduced into the pixel-type grating is diffracted in the pixel-type grating to form a plurality of first-order diffraction light rays in a one-to-one correspondence with display pixels, the plurality of first-order diffraction light rays are incident on an optical waveguide opposite to a light-emitting surface of the optical waveguide in which the pixel-type grating is located; and diffraction angles and diffraction azimuth angles of each of the first-order diffraction light rays are different;

wherein a pixel-type grating corresponding to each layer of optical waveguides comprises k gratings in a one-to-one correspondence with k display pixels; gratings corresponding to a same display pixel in adjacent two layers of optical waveguides have a same grating cycle and having different grating phases.

2. The directional optical waveguide according to claim 1, wherein the time division multiplexing unit comprises N three-dimensional display drive voltage modules in a one-to-one correspondence with the N layers of optical waveguides, a time length Λ of a voltage drive cycle of each of the three-dimensional display drive voltage modules is the same as a time length T of the each frame video stream cycle; a time length of a voltage drive cycle of each of the voltage drive cycles is Λ/N, and a time length of each of the frame video periods is T/N;

during each voltage drive cycle, the N three-dimensional display drive voltage modules is configured to control, according to the stacking order of the N layers of optical waveguides, a corresponding optical waveguide to introduce the source light ray into the corresponding pixel-type grating; wherein, during each voltage drive period, one of the N three-dimensional display drive voltage modules is configured to control the corresponding optical waveguide to introduce the source light ray into the corresponding pixel-type grating.

3. The directional optical waveguide according to claim 2, wherein in the N layers of optical waveguides, a bottom of a first-layer optical waveguide and a light-emitting surface of an $N^{th}$-layer optical waveguide are both exposed, an exterior of a pixel-type grating corresponding to the $N^{th}$-layer optical waveguide is covered with a light guide plate; or in the N layers of optical waveguides, a light-emitting surface of the first-layer optical waveguide and a bottom surface of the $N^{th}$-layer optical waveguide are both exposed, an exterior of a pixel-type grating corresponding to the first-layer optical waveguide is covered with a light guide plate;

the time division multiplexing unit further comprises a control module and a two-dimensional display voltage drive module, output terminals of the control module being respectively connected to input terminals of the two-dimensional display voltage drive module and the N three-dimensional display voltage drive modules;

the control module is configured to: send, to the N three-dimensional display voltage drive modules during three-dimensional display, a three-dimensional display operation instruction for enabling the N three-dimensional display voltage drive modules; and send, to the two-dimensional display voltage drive module during two-dimensional display, a two-dimensional display operation instruction for enabling the two-dimensional display voltage drive module.

4. The directional optical waveguide according to claim 1, wherein a pixel-type grating corresponding to each of the optical waveguides is a chirped grating.

5. The directional optical waveguide according to claim 1, wherein a pixel-type grating corresponding to each layer of optical waveguides comprises k gratings in a one-to-one correspondence with k display pixels; the display pixel comprises a plurality of subpixels of different colors; each of the gratings comprises a plurality of sub-gratings in a one-to-one correspondence with the plurality of subpixels, and a longer color wavelength of the subpixel corresponding to the sub-grating leads to a longer grating cycle of the sub-grating.

6. The directional optical waveguide according to claim 1, wherein a plurality of grooves constituting the pixel-type grating are formed on a light-emitting surface of each layer of optical waveguides;

in the N layers of optical waveguides, when the bottom of the first-layer optical waveguide and the light-emitting surface of the $N^{th}$-layer optical waveguide are both exposed, depths of grooves corresponding to the N layers of optical waveguides gradually decreasing according to the stacking order of the N layers of optical waveguides; or in the N layers of optical waveguides, when a light-emitting surface of the first-layer optical waveguide and a bottom surface of the $N^{th}$-layer optical waveguide are both exposed, depths of grooves corresponding to the N layers of optical waveguides gradually increasing according to the stacking order of the N layers of optical waveguides.

7. The directional optical waveguide according to claim 1, wherein there is a gap between adjacent two layers of optical waveguides.

8. The directional optical waveguide according to claim 7, wherein each of the optical waveguides comprises a display corresponding area and a peripheral corresponding area formed at a periphery of the display corresponding area, the pixel-type grating is formed in a display corresponding area corresponding to the optical waveguide;

a portion of the gap corresponding to the peripheral corresponding area is provided with a support between the adjacent two layers of the optical waveguides.

9. The directional optical waveguide according to claim 7, wherein a transparent dielectric layer is located in the gap and is disposed between the two adjacent layers of the optical waveguides; a refractive index of the transparent dielectric layer is less than refractive indexes of two layers of optical waveguides adjacent to the transparent dielectric layer.

10. The directional optical waveguide according to claim 7, wherein in the N layers of optical waveguides, when a bottom of the first-layer optical waveguide and the light-emitting surface of the $N^{th}$-layer optical waveguide are both exposed, an optical waveguide characteristic equation of each layer of the optical waveguide is:

$$k_{ix}d_i - \arctan\frac{\sqrt{(n_i^2 - n_{i0}^2)k_0^2 - k_{ix}^2}}{k_{ix}} - \arctan\frac{\sqrt{(n_i^2 - n_{(i+1)0}^2)k_0^2 - k_{ix}^2}}{k_{ix}} = m_i\pi,$$

$$m_i = 0, 1, 2, \ldots$$

in the N layers of optical waveguides, when a light-emitting surface of the first-layer optical waveguide and a bottom surface of the $N^{th}$-layer optical waveguide are both exposed, an optical waveguide characteristic equation of each layer of the optical waveguides is:

$$k_{ix}d_i - \arctan\frac{\sqrt{(n_i^2 - n_{(i+1)0}^2)k_0^2 - k_{ix}^2}}{k_{ix}} - \arctan\frac{\sqrt{(n_i^2 - n_{i0}^2)k_0^2 - k_{ix}^2}}{k_{ix}} = m_i\pi,$$

$$m_i = 0, 1, 2, \ldots$$

$k_{ix}$ is a component of a wave vector of an $i^{th}$ optical waveguide in an x-axis direction, $k_0=2\pi/\lambda$, $\lambda$ is a wavelength of a light ray, $n_i$ is a refractive index of the $i^{th}$-layer optical waveguide, and $n_{i0}$ is a refractive index of an area between the $i^{th}$-layer optical waveguide and the $(i-1)^{th}$ layer of optical waveguide, $n_{(i+1)0}$ is a refractive index of an area between the $i^{th}$-layer optical waveguide and the $(i+1)^{th}$ layer of optical waveguide, $d_i$ is a thickness of the $i^{th}$-layer optical waveguide, $m_i$ is the number of first-order diffraction light rays diffracted by a pixel-type grating corresponding to the $i^{th}$-layer optical waveguide, and i is an integer that is greater than or equal to 1 and less than or equal to N.

11. A directional backlight module, comprising the directional optical waveguide according to claim 1 and N three-dimensional display light sources, wherein the N three-dimensional display light sources and N layers of optical waveguides are in a one-to-one correspondence; each of the three-dimensional display light sources is disposed on a side of the corresponding optical waveguide, and the N three-dimensional display light sources are respectively connected to a time division multiplexing unit through signals.

12. The directional backlight module according to claim 11, wherein in the N layers of optical waveguides, when a bottom of the first-layer optical waveguide and a light-emitting surface of the $N^{th}$-layer optical waveguide are both exposed, a reflection plate is provided at the bottom of the first-layer optical waveguide; or
  in the N layers of optical waveguides, when a light-emitting surface of the first-layer optical waveguide and a bottom surface of the $N^{th}$-layer optical waveguide are both exposed, a reflection plate is provided at the bottom of the $N^{th}$-layer optical waveguide.

13. The directional backlight module according to claim 11, wherein when the directional optical waveguide comprises a light guide plate, the directional backlight module further comprises a two-dimensional display light source, the two-dimensional display light source is disposed at a side of the light guide plate, and the two-dimensional display light source is connected to the time division multiplexing unit through signal.

14. The directional backlight module according to claim 13, wherein the two-dimensional display light source and each of the three-dimensional display light sources both comprise a light source and a light collimation module disposed on a light-emitting surface of the light source.

15. A display device, comprising the directional backlight module according to claim 11 and an optical switching member located on a light-emitting surface of the directional backlight module.

16. The display device according to claim 15, wherein the optical switching member is a liquid crystal display panel.

* * * * *